(12) United States Patent
Yuan et al.

(10) Patent No.: US 10,852,777 B2
(45) Date of Patent: Dec. 1, 2020

(54) FLIPPABLE ELECTRONIC DEVICE

(71) Applicant: Lenovo (Beijing) Co., Ltd., Beijing (CN)

(72) Inventors: Chunfeng Yuan, Beijing (CN); Matthew Tucker, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/586,952

(22) Filed: Sep. 28, 2019

(65) Prior Publication Data
US 2020/0103945 A1 Apr. 2, 2020

(30) Foreign Application Priority Data

Sep. 30, 2018 (CN) .......................... 2018 1 1160096

(51) Int. Cl.
*G06F 1/16* (2006.01)
*E05D 7/00* (2006.01)

(52) U.S. Cl.
CPC .......... *G06F 1/1681* (2013.01); *G06F 1/1618* (2013.01); *E05D 7/00* (2013.01); *E05Y 2900/606* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 6,154,359 | A * | 11/2000 | Kamikakai | ........... | G06F 1/1618 16/342 |
| 6,771,494 | B2 * | 8/2004 | Shimano | ............... | G06F 1/1616 345/173 |
| 8,687,354 | B2 * | 4/2014 | Uchiyama | ............. | G06F 1/1681 16/330 |
| 9,268,371 | B2 * | 2/2016 | Chen | ..................... | G06F 1/1681 |
| 9,411,365 | B1 * | 8/2016 | Tanner | .................. | G06F 1/1618 |
| 9,417,663 | B2 * | 8/2016 | Kinoshita | ............... | G06F 1/166 |
| 9,500,013 | B2 * | 11/2016 | Senatori | .................... | E05D 3/12 |
| 9,523,226 | B1 * | 12/2016 | Lam | ..................... | E05D 11/082 |
| 9,600,036 | B2 * | 3/2017 | Uchiyama | ............. | G06F 1/1618 |
| 9,791,895 | B2 * | 10/2017 | Hsu | ........................ | G06F 1/1681 |
| 9,846,458 | B2 * | 12/2017 | Kinoshita | ............. | G06F 1/1681 |
| 9,921,613 | B2 * | 3/2018 | Kuramochi | ........... | G06F 1/1681 |
| 9,933,813 | B2 * | 4/2018 | Ohishi | .................. | G06F 1/1618 |
| 9,983,633 | B2 * | 5/2018 | Tamura | ................. | G06F 1/1662 |
| 10,061,396 | B1 * | 8/2018 | Shibayama | ........... | G06F 1/1677 |
| 10,108,224 | B2 * | 10/2018 | Tsubaki | ................ | G06F 1/1616 |
| 10,110,992 | B2 * | 10/2018 | Sato | ...................... | G06F 1/1616 |

(Continued)

*Primary Examiner* — Lisa Lea-Edmonds
(74) *Attorney, Agent, or Firm* — Anova Law Group, PLLC

(57) ABSTRACT

The present disclosure provides an electronic device. The electronic device includes: a connection component; a first main body having a first end connected to the connection component; and a second main body having a second end connected to the connection component. In response to the first main body and the second main body being in a first relative position, a distance in a pre-set direction between the first end and the second end is a first distance. In response to the first main body and the second main body being in a second relative position, a distance in a pre-set direction between the first end and the second end is a second distance. The first distance and the second distance are different.

14 Claims, 8 Drawing Sheets

(56) References Cited

U.S. PATENT DOCUMENTS

| | | | | |
|---|---|---|---|---|
| 10,146,266 | B2* | 12/2018 | Shibayama | G06F 1/1616 |
| 10,152,092 | B2* | 12/2018 | Kinoshita | G06F 1/1601 |
| 10,488,882 | B2* | 11/2019 | Maatta | G06F 1/1618 |
| 10,496,129 | B2* | 12/2019 | Miyamoto | G06F 1/3215 |
| 2012/0162888 | A1* | 6/2012 | Arima | G06F 1/1681 |
| | | | | 361/679.08 |
| 2014/0036425 | A1* | 2/2014 | Tsao | G06F 1/1681 |
| | | | | 361/679.01 |
| 2015/0301564 | A1* | 10/2015 | Chang | G06F 1/1679 |
| | | | | 361/679.27 |
| 2017/0254127 | A1* | 9/2017 | Uchiyama | E05D 3/14 |
| 2017/0308130 | A1* | 10/2017 | Hsu | G06F 1/1616 |

* cited by examiner

FLIPPABLE ELECTRONIC DEVICE

CROSS-REFERENCE TO RELATED APPLICATIONS

This application claims the priority of Chinese Patent Application No. 201811160096.2, filed on Sep. 30, 2018, the entire contents of which are incorporated herein by reference.

FIELD OF THE DISCLOSURE

The present disclosure generally relates to the field of electronic device technology and, more particularly, relates to an electronic device.

BACKGROUND

An electronic device including at least two main bodies may be connected by a connection component including rotating shafts. To make the electronic device lighter and thinner, the size of the connection component has also been reduced. However, under certain circumstances, the size of the connection component is small enough, but in response to the electronic device being in a particular attitude, the two main bodies connected by the connection component cannot provide sufficient space to accommodate other modules of the electronic device. Therefore, it is an urgent to solve the problem to provide light and thin electronic devices with sufficient accommodation space.

BRIEF SUMMARY OF THE DISCLOSURE

One aspect of the present disclosure provides an electronic device. The electronic device includes: a connection component; a first main body having a first end connected to the connection component; and a second main body having a second end connected to the connection component. In response to the first main body and the second main body being in a first relative position, a distance in a pre-set direction between the first end and the second end is a first distance. In response to the first main body and the second main body being in a second relative position, a distance in a pre-set direction between the first end and the second end is a second distance. The first distance and the second distance are different.

Other aspects of the present disclosure can be understood by those skilled in the art in light of the description, the claims, and the drawings of the present disclosure

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

To make the foregoing objectives, features and advantages of the present disclosure clearer and more understandable, the present disclosure will be further described with reference to the accompanying drawings and embodiments.

Figure 1:
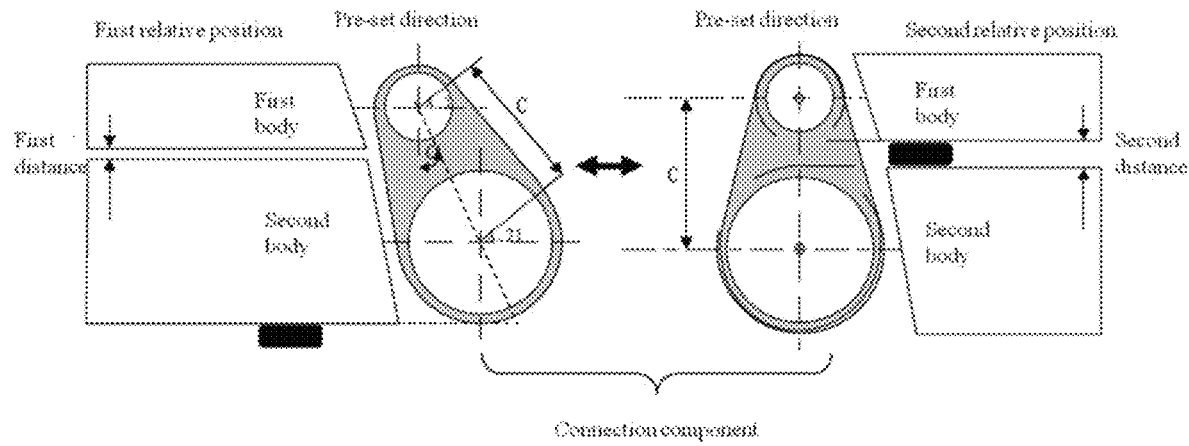
FIG. 1 illustrates a schematic diagram of an example of an electronic device according to some embodiments of the present disclosure.

As shown in FIG. 1, the present disclosure provides an electronic device. The electronic device includes a connection component, a first main body having a first end connected to the connection component, and a second main body having a second end connected to the connection component. In response to the first main body and the second main body being in a first relative position, a distance between the first end and the second end in a pre-set direction is a first distance. In response to the first main body and the second main body being in a second relative position, a distance between the first end and the second end in a pre-set direction is a second distance. The first distance and the second distance are different.

The electronic device provided by the embodiments of the present disclosure may be any electronic device including two main bodies, such as a notebook computer, and a tablet computer that includes two parts, etc.

The connection component may be a module that connects the two main bodies, such that the first main body rotates relative to the second main body to switch between the first relative position and the second relative position.

In some embodiments, the connection component may include at least two parts that rotate relative to each other. The distance in the pre-set direction between the two parts may vary. A change of the distance in the pre-set direction between the first end and the second end of the two main bodies may be caused by a change of the distance in the pre-set direction between two parts of the connection component.

In some embodiments, both the first main body and the second main body include a housing. The housings are fixedly connected to the two relatively rotating parts of any of the previously described connection component. As such, the first main body and the second main body may rotate relative to each other through the connection component.

For example, a display module may be configured inside the housing of the first main body. The display module may be a liquid crystal (LCD) display module, an electronic ink display module, or an organic light emitting diode (OLED) display module, etc. At this time, a human-machine interaction module such as a keyboard or a touch panel may be configured inside the housing of the second main body.

In some embodiments, the first main body and the second main body may have different relative positions. At different relative positions of the first main body and the second main body, the distances in the pre-set direction between the first end and the second end may be different. At connection ends of the connection component, at least two distances in the pre-set direction, including a first distance and a second distance respectively, may exist between the first main body and the second main body. The first distance and the second distance are unequal.

As such, in the case that the two main bodies of the electronic device are configured with a particular module occupying a certain volume, in response to the relative position of the two main bodies changing, a sufficient space may be reserved for accommodating the particular module.

Figure 9:
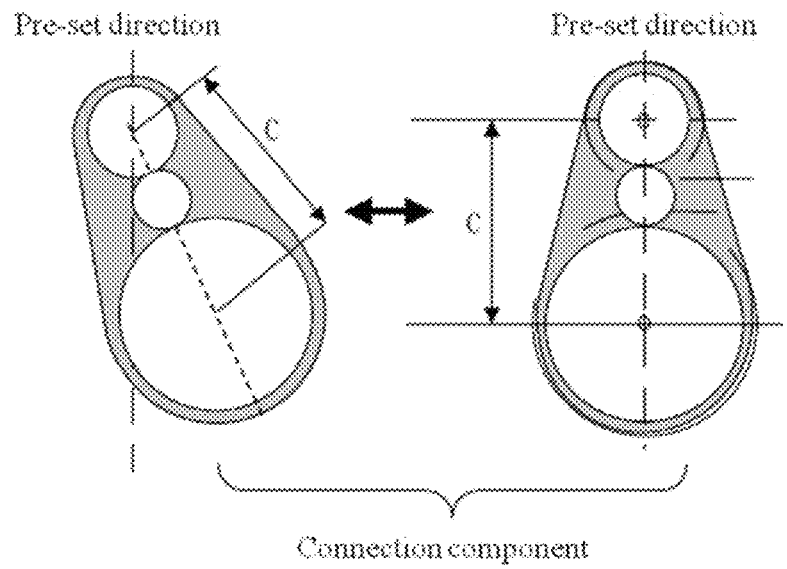
FIG. 9 illustrates a schematic diagram of switching a relative position relationship between a first main body and a second main body of an electronic device according to some embodiments of the present disclosure.
Figure 10:
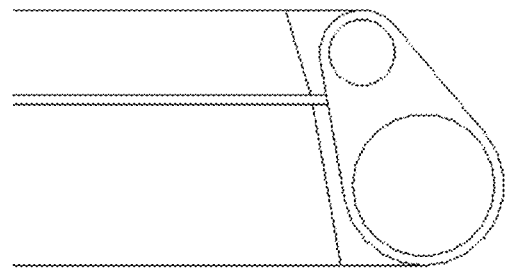
FIG. 10 illustrates a schematic diagram of an internal structure of an electronic device according to some embodiments of the present disclosure.
Figure 11:
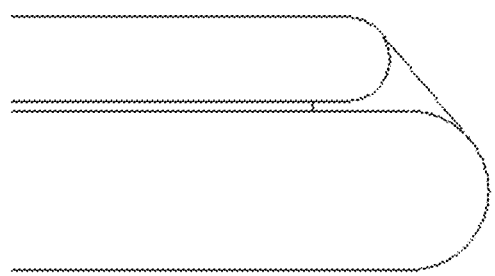
FIG. 11 illustrates a schematic diagram of an appearance of an electronic device in an attitude according to some embodiments of the present disclosure.
Figure 12:
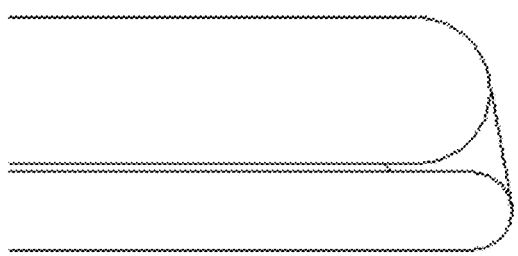
FIG. 12 illustrates a schematic diagram of an appearance of an electronic device in another attitude according to some embodiments of the present disclosure.

As shown in FIG. 1 and FIG. 9, for the connection component of the electronic device being the connection component as shown in FIG. 1 or FIG. 9, the pre-set direction in FIG. 1 and FIG. 9 may be a direction perpendicular to a support surface on which the electronic device is placed. In the left half of FIG. 1 and FIG. 9, a direction of a line connecting axes of two assemblies of the connection component and the pre-set direction form a certain angle (e.g., the angle $\alpha$ in FIG. 1). At this time, the distance between the first main body and the second main body is small. The electronic device formed by the first main body and the second main body has a thin thickness in the pre-set direction, thereby achieving the thinning of the electronic device at this attitude. In the right half of FIG. 1 and FIG. 9, the direction of the line connecting axes of the two assemblies of the connection component overlaps or is parallel with the pre-set direction. At this time, the distance between the first main body and the second main body is relatively large to provide the sufficient space or distance to accommodate other modules (e.g., support pads of the electronic device). Further, the electronic device formed by the first main body and the second main body has the thickness slightly greater than the thickness of the electronic device in response to the axis connection line and the pre-set direction forming the certain angle.

In some embodiments, the electronic device further includes at least one support component installed on the first main body and/or the second main body. In response to the distance in the pre-set direction between the first main body and the second main body being the first distance, the support component is located on one side of both the first main body and the second main body. In response to the distance in the pre-set direction between the first main body and the second main body being the second distance, the support component is located between the first main body and the second main body. The second distance is greater than the first distance. The second distance is greater than or equal to a width or height in the pre-set direction of the support component.

In some embodiments, the particular module includes the support component. The support component is a component that supports the electronic device on the support surface. The support surface may include a desktop surface and/or a floor surface.

There may be a plurality of support components, for example, N of support components, that are evenly distributed at the first end or the second end. N may be an integer such as 2, 3, or 4. The number of the support components may be one or more. For example, a notebook computer includes at least two support components.

In some embodiments, the distance in the pre-set direction between the first end and the second end is the first distance. The support component is located on one side of the two main bodies at the same time, for example, on the left side of the two main bodies or on the right side of the two main bodies at the same time.

In response to the distance in the pre-set direction between the first end and the second end being the second distance, the support component is located between the two main bodies.

In some embodiments, the first distance is smaller than the second distance. As such, in response to the support component being located on one side of the two main bodies, the electronic device can be made as thin and light as possible. In response to the two main bodies of the electronic device being in the second relative position, the distance in the pre-set direction between the first end and the second end is extended. The extended distance is sufficient to accommodate the support component. In some embodiment, the first distance is smaller than the width of the support component in the pre-set direction.

In addition, because the first main body and the second main body in the second relative position provides more accommodation space, the width of the support component in the pre-set direction may be wider (i.e., the height may be taller) and the height of the support component is increased. As such, the electronic device may provide a more comfortable use attitude to a user. At the same time, the distance between the support surface and the desktop surface is increased to improve the heat dissipation capability, thereby eliminating the problem of system instability caused by insufficient heat dissipation.

Figure 2:
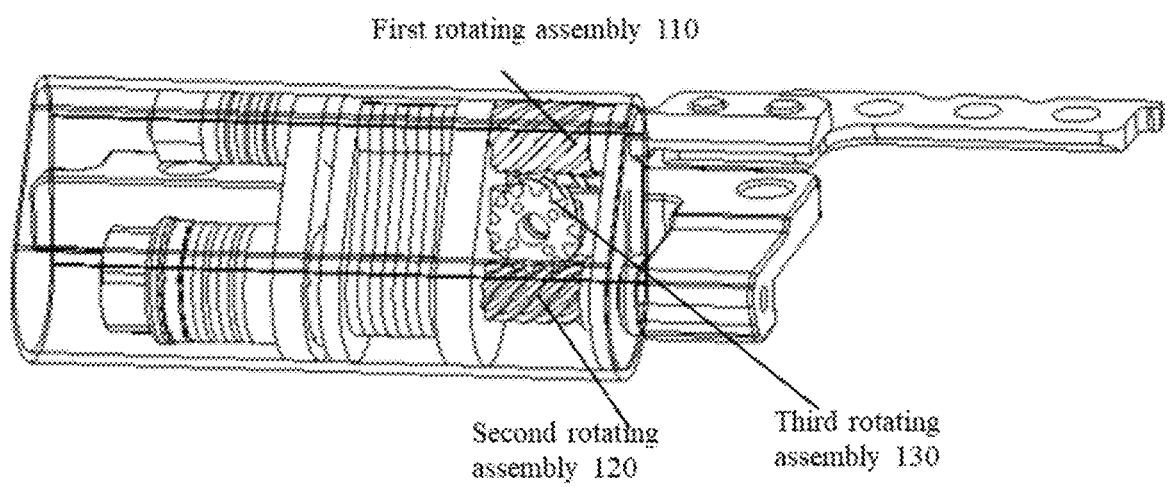
FIG. 2 illustrates a schematic diagram of an example of a connection component according to some embodiments of the present disclosure.
Figure 3:
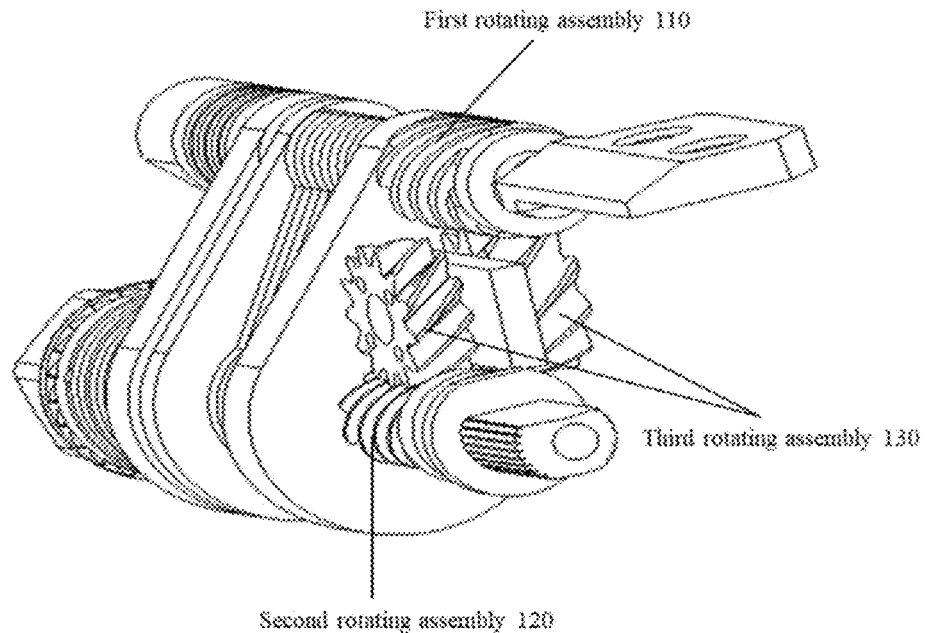
FIG. 3 illustrates a schematic diagram of another example of a connection component according to some embodiments of the present disclosure.

In some embodiments, as shown in FIG. 2 and FIG. 3, the connection component includes a first rotating assembly 110 having a first rotating shaft, a second rotating assembly 120 having a second rotating shaft, and a third rotating assembly 130 coupled to the first rotating assembly 110 and the second rotating assembly 120. The first rotating shaft and the second rotating shaft satisfies a parallel condition. The first rotating assembly 110 and the second rotating assembly 120 are driven by the third rotating assembly 130. The transmission ratio between the first rotating assembly 110 and the second rotating assembly 120 is P:1, where P is positive number unequal to 1.

The distance in the pre-set direction between the first rotating assembly 110 and the second rotating assembly 120 may be a third distance or a fourth distance. The third distance and the fourth distance are different.

In response to the distance in the pre-set direction between the first rotating assembly 110 and the second rotating assembly 120 being the third distance, the distance between the first end and the second end is the first distance. In response to the distance in the pre-set direction between the first rotating assembly 110 and the second rotating assembly 120 being the fourth distance, the distance between the first end and the second end is the second distance. The third distance and the fourth distance are different.

In some embodiments, the third distance corresponds to the first distance, and the fourth distance corresponds to the second distance. That is, in response to the first main body and the second main body being in the first relative position, the distance in the pre-set direction between the first rotating assembly 110 and the second rotating assembly 120 is the third distance, and in response to the first main body and the second main body being in the second relative position, the distance in the pre-set direction between the first rotating assembly 110 and the second rotating assembly 120 is the fourth distance.

The first rotating assembly 110 may include one or more rotating shafts. In some embodiments, the rotating shafts included in the first rotating assembly 110 are collectively referred to as first rotating shafts. In response to the first rotating shafts including a plurality of rotating shafts, the plurality of rotating shafts may be connected by various connecting members such as a bushing.

Similarly, the second rotating assembly 120 may include one or more rotating shafts. In some embodiments, the rotating shafts included in the second rotating assembly 120 are collectively referred to as second rotating shafts. In response to the second rotating shafts 120 including a plurality of rotating shafts, the plurality of rotating shafts may be connected by various connecting members such as a bushing.

In some embodiments, the parallel condition that the first rotating assembly 110 and the second rotating assembly 120 satisfies includes the following two cases. Case 1: the rotation axes of the first rotating assembly 110 and the second rotating assembly 120 are parallel. Case 2: the rotation axes of the first rotating assembly 110 and the second rotating assembly 120 are approximately parallel. Approximately parallel refers to that a minimum angle formed between the axes of the two rotating shafts is smaller than an angle threshold. The angle threshold may be 3° or 5°, etc. The examples of the angle threshold are for illustrative purposes and are not intended to limit the present disclosure.

In some embodiments, the third rotating assembly 130 is drivingly coupled to the first rotating assembly 110 and the second rotating assembly 120, respectively. The drivingly coupling refers to that the third rotating assembly 130 may transmit power to the first rotating assembly 110 and/or the second rotating assembly 120.

In some embodiments, the third rotating assembly 130 may include, but is not limited to, one or more gears. The first rotating shaft and the second rotating shaft may be worm screws configured with rotating teeth on the surfaces in response to the gear included in the third rotating assembly 130 being a worm wheel. Drivingly coupling the third rotating assembly 130 to the first rotating assembly 110 and the second rotating assembly 120, respectively, includes coupling of the worm screws and the worm wheel.

In some embodiments, the third rotating assembly 130 is an intermediate driving assembly between the first rotating assembly 110 and the second rotating assembly 120. In some embodiments, the transmission ratio between the first rotating assembly 110 and the second rotating assembly 120 is P:1. Because P is unequal to 1 in P:1, a non-equal driving is achieved between the first rotating assembly 110 and the second rotating assembly 120.

In some embodiments, through the non-equal driving, the distance in the pre-set direction between the first rotating assembly 110 and the second rotating assembly 120 may vary.

In some embodiments, in response to distance between the first rotating assembly 110 and the second rotating assembly 120 being the third distance, the direction of the line connecting the axes of the first rotating assembly 110 and the second rotating assembly 120 is the pre-set direction. After the first rotating assembly 110 and the second rotating assembly 120 rotate, the distance in the pre-set direction between the first rotating assembly 110 and the second rotating assembly 120 may increase or decrease.

As such, at different relative positions between the first rotating assembly 110 and the second rotating assembly 120, the accommodation space in the pre-set direction between the first rotating assembly 110 and the second rotating assembly 120 varies. Thus, the requirement for different accommodation spaces at different attitudes of the electronic device employing the connection component is satisfied.

In some embodiments, the first rotating assembly 110 and the second rotating assembly 120 have a same number of gear teeth. The third rotating assembly 130 includes a first gear that engages with the first rotating assembly 110 and a second gear that engages with the second rotating assembly 120. The first gear and the second gear rotate synchronously, and the first gear and the second gear have different numbers of the gear teeth.

In some embodiments, the first gear and the second gear have a same number of gear teeth. To achieve a non-equal driving, the third rotating assembly 130 includes the first gear 131 and the second gear 132. The first gear 131 and the second gear 132 have different numbers of the gear teeth. For example, the first gear 131 has 10 gear teeth and the second gear 132 has 20 gear teeth). The synchronous rotation of the first gear 131 and the second gear 132 refers to that the first gear 131 and the second gear 132 rotate by a same degree. For example, the first gear 131 and the second gear 132 rotate by 36°. The first gear 131 rotates in a rotation direction by one gear tooth and the second gear 132 rotates in the rotation direction by two gear teeth. Through gear coupling, the first rotating shaft rotates by one gear tooth and the second rotating shaft rotates by two gear teeth. Thus, the non-equal driving is achieved. In this case, the transmission ratio is P:1=1:2.

Figure 4:
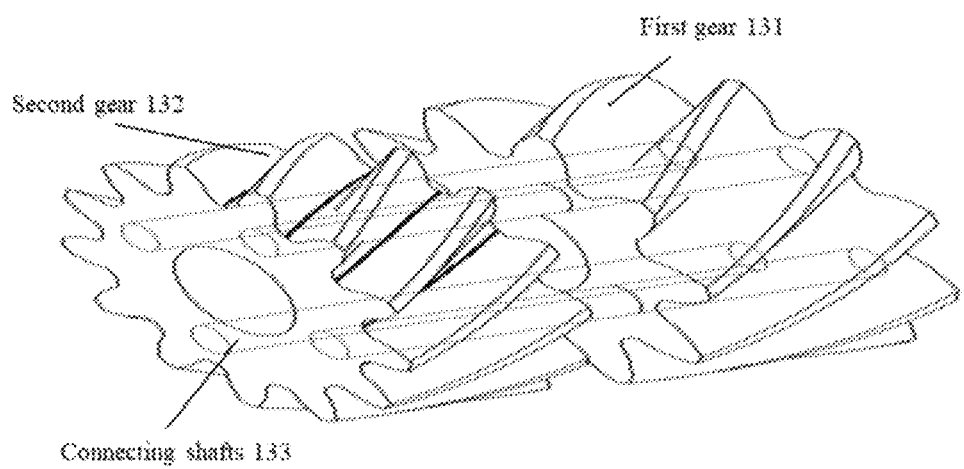
FIG. 4 illustrates a schematic diagram of an example of a rotating assembly according to some embodiments of the present disclosure.
Figure 5:
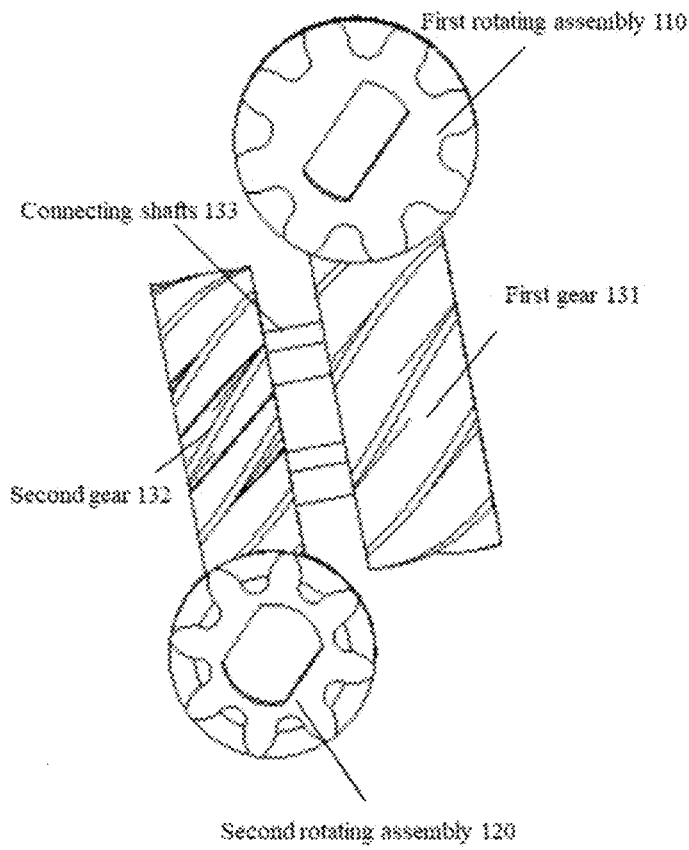
FIG. 5 illustrates a schematic diagram of another example of a connection component according to some embodiments of the present disclosure.

In some embodiments, as shown in FIG. 4 and FIG. 5, the third rotating assembly 130 includes the first gear 131 having first gear teeth and first connecting holes and the second gear 132 having second gear teeth and second connecting holes. The first connecting holes and the second connecting holes are configured with connecting shafts 133 that connect the first gear 131 and the second gear 132 together.

To achieve the synchronous rotation between the first gear 131 and the second gear 132, a first rotating wheel having the first gear teeth is configured with the first connecting holes, and a second rotating wheel having the second gear teeth is configured with the second connecting holes.

Both the first connecting holes and the second connecting holes include a plurality of connecting holes. The first connecting holes and the second connecting holes have a same number of connecting holes and are located at positions corresponding to each other.

The first connecting holes and the second connecting holes are configured with the connecting shafts 133.

In some embodiments, the connecting shafts 133 are rigid shafts. The rigid shafts may be rigid rivets made of a metallic material or a non-metallic material.

For example, the number of the first connecting holes and the number of the second connecting holes both are N. The first connecting holes and the second connecting holes are angular-equally distributed on the first rotating wheel and the second rotating wheel. In this case, the number of the connecting shafts is N. Each of the connecting shafts 133 has one end located in one of the first connecting holes and another end located in one of the second connecting holes.

The synchronous rotation of the first rotating wheel and the second rotating wheel is achieved through the connecting shafts 133.

In some embodiments, the first gear teeth and the second gear teeth are located in different rotational planes of a same rotating structure.

In some embodiments, the first gear teeth and the second gear teeth are two sets of gear teeth located in different rotating planes of the same rotating structure. As such, because the first gear teeth and the second gear teeth are located on the same rotating structure, the first gear teeth and the second gear teeth inevitably rotate synchronously.

A gap may be configured between the first gear teeth and the second gear teeth to facilitate that the first gear teeth engage with the first rotating assembly 110 and the second gear teeth engage with the second rotating assembly 120. Through the configuration ratio of the gap, transmission abnormalities caused by slight errors during the rotation of the first rotating assembly 110 and the second rotating assembly 120 may be reduced.

In some embodiments, a first tooth depth of the first gear teeth is unequal to a second tooth depth of the second gear teeth. Because the first gear teeth and the second gear teeth have different tooth depths, the two sets of the gear teeth located on the same rotating structure may have different diameters. As such, the third rotating assembly 130 is able to engage with the first rotating assembly 110 and the second rotating assembly 120 at different spatial positions, respectively.

In some embodiments, a spacer 134 may be configured between the first gear teeth and the second gear teeth. The spacer 134 may be configured in a pre-set plane between a first rotating plane and a second rotating plane. The pre-set plane is parallel with the first rotating plane and the second rotating plane, respectively. The first rotating plane and the second rotating plane are parallel with each other too. The spacer 134 may be a metal spacer. The configuration of the spacer 134 may avoid the transmission abnormalities caused by misalignment between the first rotating assembly 110 and the second rotating assembly 120, thereby improving the operation stability of the connection component.

In some embodiments, a ratio of a first gear tooth number of the first rotating assembly 110 over a second gear tooth number of the second rotating assembly 120 is 1:P.

In some embodiments, the ratio of the first gear tooth number of the first rotating assembly 110 over the second gear tooth number of the second rotating assembly 120 is 1:P. The non-equal driving is achieved in response to being driven by the third rotating assembly 130.

According to gear design requirements, the gear tooth number and the pitch diameter of the gear may have to satisfy certain requirement. In response to the first gear tooth number of the first rotating assembly 110 and the second gear tooth number of the second rotating assembly 120 being different, the gear diameters of the first rotating assembly 110 and the second rotating assembly 120 are different.

In some embodiments, in response to the distance in the pre-set direction between the first rotating assembly 110 and the second rotating assembly 120 being the third distance, a first rotation angle of the first rotating assembly 110 and a second rotation angle of the second rotating assembly 120 both are zero. In response to the distance in the pre-set direction between the first rotating assembly 110 and the second rotating assembly 120 being the fourth distance, a sum of the first rotation angle of the first rotating assembly 110 and the second rotation angle of the second rotating assembly 120 is 360°.

In response to the first rotation angle and the second rotation angle being zero, it may be assumed that the first rotating assembly 110 and the second rotating assembly 120 are in a default initial state.

In some embodiments, in response to sum of the first rotation angle and the second rotation angle being 360°, 360° rotation of the two main bodies connected to the connection component is achieved.

In some embodiments, the third distance is smaller than the fourth distance.

As shown in FIG. 1, in some embodiments, the first rotation angle is 180°−α and the second rotation angle is 180°+α. As such, the sum of the first rotation angle and the second rotation angle is exactly 360° and/or the transmission ratio is (180−α)/(180+α), that is, P:1=(180−α)/(180+α).

In some embodiments, the third distance is equal to C*cos α. The fourth distance is qual to C. C is a straight-line distance between the first rotating shaft and the second rotating shaft.

In some embodiments, the transmission ratio between the first rotating assembly 110 and the third rotating assembly 130 is p1/p2. The transmission ratio between the second rotating assembly 110 and the third rotating assembly 130 is p3/p4. p1/p2 is unequal to p3/p4.

Different use attitudes of the electronic device correspond to different use modes of the electronic device. For example, the two main bodies of the electronic device may be completely closed, which corresponds to one of the use modes. The two main bodies may form a certain angle, which corresponds to another one of the use modes.

Figure 13:
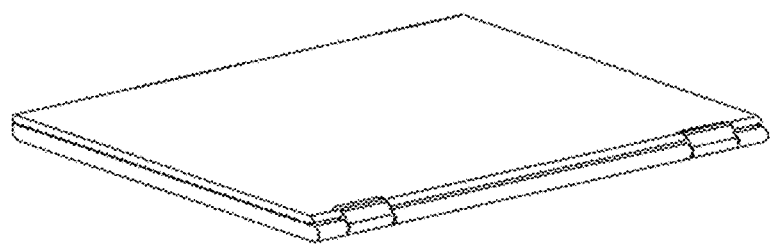
FIG. 13 illustrates a schematic diagram of an attitude of an electronic device according to some embodiments of the present disclosure.
Figure 14:
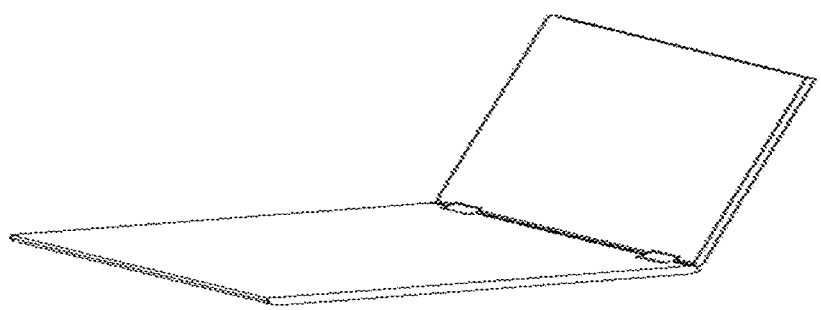
FIG. 14 illustrates a schematic diagram of another attitude of an electronic device according to some embodiments of the present disclosure.

For example, the attitude of the electronic device as shown in FIG. 13 corresponds to a first use mode, and the attitude of the electronic device as shown in FIG. 14 corresponds to a second use mode.

In the first use mode, the first main body and the second are closed together. The first main body and the second main body may be closed together in two different closed attitudes, which include a first closed attitude and a second closed attitude. For example, in response to the closed attitude shown in the left half of FIG. 1 being the first closed attitude, the closed attitude shown in the right half of FIG. 1 is the second closed attitude.

A particular module of a certain height (also referred to as length) may be configured on the surface of the first main body and/or the second main body. In the second closed attitude, the particular module such as the support component may be disposed between the first main body and the second main body. In this case, the first main body and the second main body have to be separated by a sufficient distance to accommodate the particular module.

In some embodiments, in response to the first main body and the second main body being closed together in the first closed attitude, the distance between the first main body and the second main body is small. The particular module such as the support component is located on a same side of the first main body and the second main body, as shown in the left half of FIG. 1. In this case, the distance between the first main body and the second is small, and the thickness of the electronic device in the pre-set direction is small.

If the first main body and the body are closed together in the second closed attitude, the distance between the first main body and the second main body is large. The particular module such as the support component is located between the first main body and the second main body, as shown in the right half of FIG. 1. In this case, the distance between the first main body and the second is increased, and the thickness of the electronic device in the pre-set direction is increased too.

In some embodiments, in response to the electronic device being in the first use mode, at least one interaction surface of a display interaction module configured on the first main body and/or second main body is located on an outer surface of the electronic device to detect user's touch control interaction or proximity interaction. In the first use mode, the electronic device may be operated by a user handholding the electronic device. For example, in response to the electronic device being a notebook and tablet two-in-one computer, an Ultrabook computer, or a tablet computer with keyboard, the first use mode may be considered as a tablet use mode. In this case, the user operates the electronic device as a tablet computer.

Figure 15:
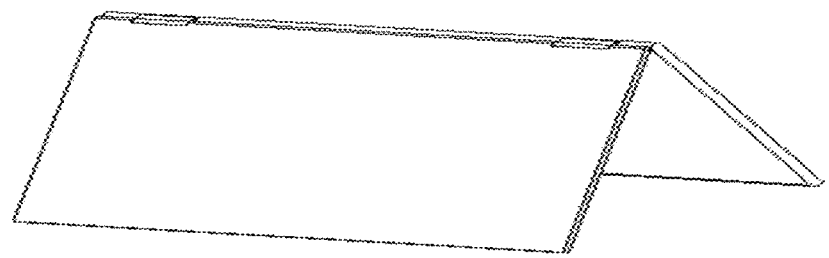
FIG. 15 illustrates a schematic diagram of another attitude of an electronic device according to some embodiments of the present disclosure.

In the second use mode, the first main body and the second main body form a certain angle as shown in FIG. 14 and FIG. 15. In the second use mode, the electronic device may have two support attitudes. FIG. 14 shows a first support attitude. FIG. 15 shows a second support attitude.

In the first support attitude as shown in FIG. 14, at least one of the first main body and the second main body is supported on a support surface. The support surface may be a desktop surface. In this case, in response to one of the two main bodies of the electronic device being directly placed on the desktop surface, the side of the body facing away from the desktop surface does not have a certain inclination, which is inconvenient for the user to operate. In this case, through the particular module such as the support component, the main body adjacent to the support surface may have the certain inclination, which is convenient for the user to operate. For example, the electronic device is a notebook computer or a tablet computer with keyboard. Through the support component, with respect to the support surface, one end of the main body of the keyboard adjacent to the connection component is slightly higher than the other end far away from the connection component. As such, the keyboard presents a certain tilt angle, which is convenient for the user to operate.

The keyboard may be a physical keyboard, such as a mechanical keyboard or a membrane keyboard. The keyboard may also be a virtual keyboard, such as a keyboard displayed on a display screen or a keyboard projected by a projector.

In the first support attitude in the second use mode as shown in FIG. 14, the electronic device may be a personal computer such as a 360° rotatable notebook computer or a tablet computer.

In the second support attitude as shown in FIG. 15, the particular module such as the support component may be located at any position. The electronic device is supported on the support surface by the ends of the first main body and the second main body away from the connection component.

Two more examples are provided below in conjunction with any of the above embodiments.

Example One

Figure 6:
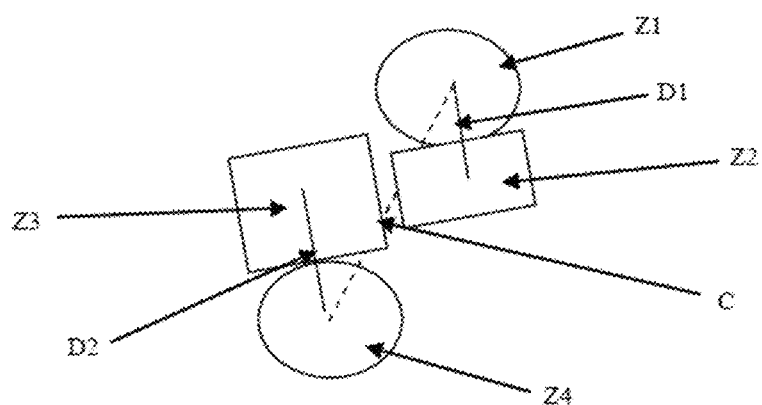
FIG. 6 illustrates a schematic diagram of another example of a connection component according to some embodiments of the present disclosure.
Figure 7:
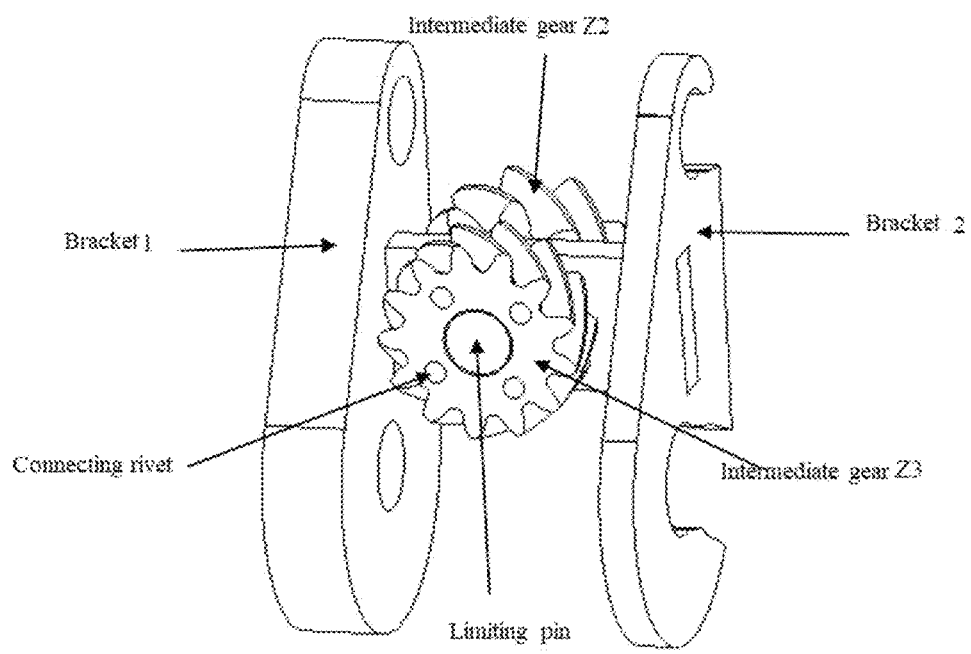
FIG. 7 illustrates a schematic diagram of another example of a connection component according to some embodiments of the present disclosure.
Figure 8:
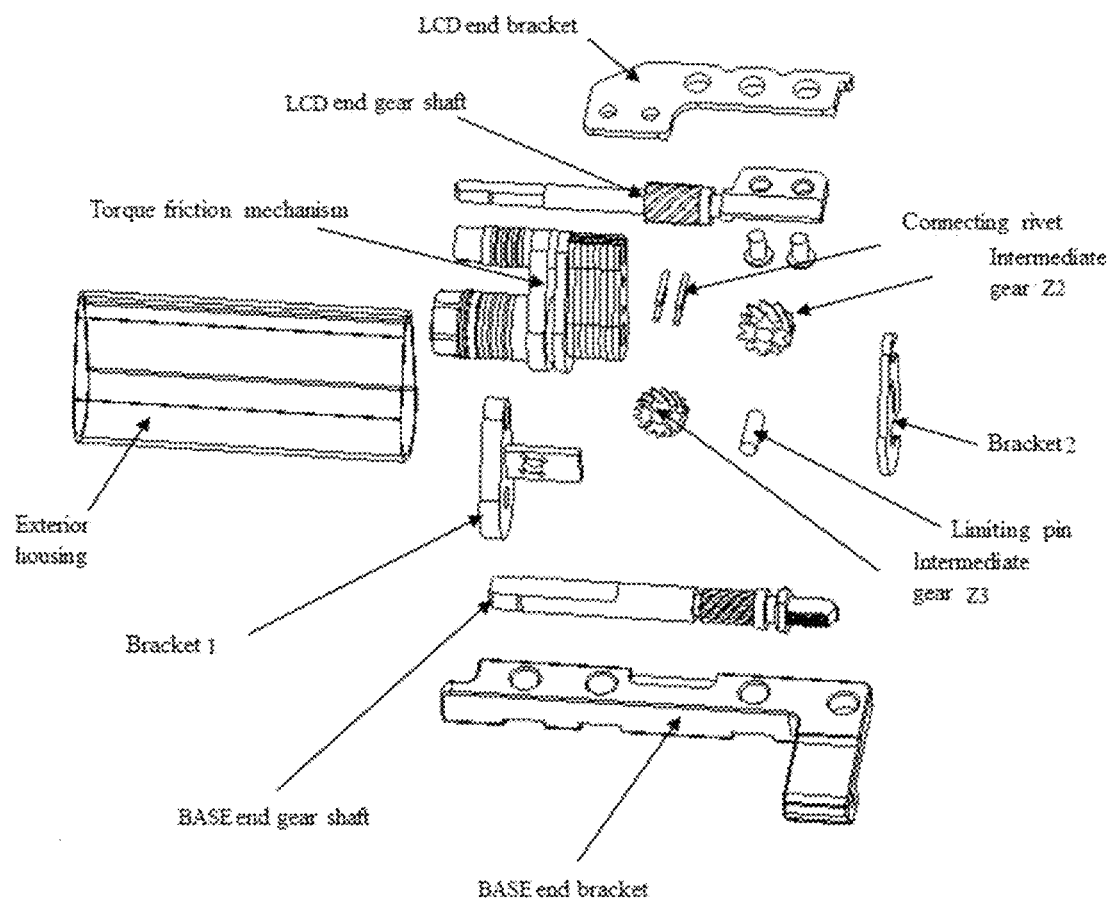
FIG. 8 illustrates an exploded view of an example of a connection component according to some embodiments of the present disclosure.

FIGS. 6-8 illustrate schematic diagrams of a connection component provided by the embodiments of the present disclosure. The intermediate gear adopts a dual-gear design. Because the intermediate gear has a large diameter, the gear tooth numbers may be adjusted by design to increase the diameter of the lower shaft gear. The diameter may be the pitch diameter. In this case, the intermediate gear may be a part of the previously described third rotating assembly. FIG. 8 and FIG. 9 illustrate the effect of increasing the diameter of the lower shaft gear relative to the upper shaft gear.

The intermediate gear adopts the dual-gear design and the two gears are interlocked. The gear tooth numbers of the two gears are $Z2$ and $Z3$, respectively. The gear tooth number of the upper shaft gear is $Z1$. The upper shaft gear engages with the intermediate gear $Z2$. In this case, the upper shaft gear is a part of the previously described first rotating assembly. The gear tooth number of the lower shaft gear is $Z4$. The lower shaft gear engages with the intermediate gear $Z3$. In this case, the lower shaft gear is a part of the previously described second rotating assembly. The transmission ratio is $(Z1/Z2)/(Z4/Z3)$, which is equal to $(180°+\alpha)/(180°-\alpha)$, and $(Z1/Z2)/(Z4/Z3)=P:1$.

$Z4$ and $Z1$ may be the same or different. For example, in response to $Z4$ being equal to $Z1$, then $Z2$ is unequal to $Z3$. In response to $Z4$ being unequal to $Z1$, then $Z2$ may be equal to $Z3$ or $Z2$ may be unequal to $Z3$. In any case, $(Z1/Z2)/(Z4/Z3)$ is unequal to 1.

In one case, the diameter of the lower shaft gear in increased to increase the gear tooth number. As such, the gear tooth numbers of the upper shaft gear and the lower shaft gear are different. At the same time, the lower shaft gear is hardened to reduce idle strokes. For example, the material of the lower shaft gear is replaced to strengthen the lower shaft gear. In another example, the lower shaft gear is strengthened by adding reinforcing ribs, etc. to the lower shaft gear.

For convenience of illustration, assuming $Z1=Z4$. The transmission ratio is simplified to $Z3/Z2$, which is equal to $(180°+\alpha)/(180°-\alpha)$. In other words, the gear tooth number $Z3$ is greater than $Z2$.

If the modulus of the two gear sets are the same, it is ensured that the pitch diameters of the upper shaft gear and the lower shaft gear are the same. The lower shaft gear may not be too small. More details are described below.

$Z1$ is the gear tooth number of the gear of the LCD module end, which is fixedly connected to the LCD module end bracket. The modulus of $Z1$ is $m1$. $Z2$ is the gear tooth number of the intermediate gear that engages with the gear $Z1$. The modulus of $Z2$ is $m1$. $Z3$ is the gear tooth number of the intermediate gear that engages with the gear $Z4$. Th modulus of $Z3$ is $m2$. $Z4$ is the gear tooth number of the gear of the BASE end. The modulus of $Z4$ is $m2$. The BASE end may be the gear fixedly connected to the BASE end bracket. The LCD end bracket may be fixedly connected to the main body with the display module. The BASE end bracket may be fixedly connected to the main body including the motherboard or the keyboard. C is the axial distance of the system with a forward inclination angle of α. D1 is the axial distance of the LCD end gear set. D2 is the axial distance of the BASE end gear set.

The gear Z2 and the gear Z3 are connected and satisfies the following equations.

$$D1=\frac{1}{2}*m1(Z1+Z2)$$

$$D2=\frac{1}{2}*m2(Z3+Z4)$$

For convenience of illustration, assuming Z1=Z4 and m2=m1. As such, it is ensured that the gear Z1 and the gear Z4 have the same pitch circle and the same pitch diameter. At the same time, to satisfy a core condition that the LCD shaft rotates less and the BASE shaft rotates more, Z3>Z2, and hence D2>D1. It may be achieved by adjusting D1 and D2. In response to the distance between D1 and D2 being adjusted, the sum of the two in the directions D1 and D2 is adjusted. Thus, the distance in the pre-set direction between the first rotating assembly and the second rotating assembly is switched from the first distance to the second distance.

The gear Z2 and the gear Z3 are required to be interlocked and may be interlocked by rivets (i.e., the interlocking rivets shown in FIG. 8). The number of rivets may be determined according actual requirements as long as the interlocking effect and the strength are ensured.

As shown in FIG. 8, the torque friction mechanism may be used to maintain the relative position between the first rotating assembly and the second rotating assembly by an increase in friction.

As shown in FIG. 8, the exterior housing may be a housing to enclose the connection component. On one hand, the exterior housing protects the internal structure of the connection component. On the other hand, the exterior housing provides an aesthetics function.

As shown in FIG. 7 and FIG. 8, the bracket 1 and the bracket 2 are configured to install the first rotating assembly and the second rotating assembly. The first rotating assembly and the second rotating assembly may rotate relative to the bracket 1 and the bracket 2, such that the two main bodies of the first rotating assembly and the second rotating assembly may rotate relative to each other.

Example Two

The present disclosure provides a connection component as shown in FIG. 1 and FIG. 9. Assuming the connection component has a forward inclination angle of a (same design applies to backward inclination), the axial distance is C (which remains unchanged during the rotation process), the gap G is designed at the closed attitude of LCD and BASE, and the transmission ratio is (180°−α)/(180°+α).

During the rotation process, LCD rotates by an angle of (180°−α) and BASE rotates by an angle of (180°+α). At the 0° closed attitude, the vertical axial distance is C*cos α. At the 360° closed attitude, the vertical axial distance is C. The axial distance is increased by C−C*cos α=C*(1−cos α). Therefore, compared to the 1:1 synchronous rotation design, the embodiment of the present disclosure increases the support pad accommodation space by C*(1−cos α) at the 360° closed attitude.

For example, in response to C=8 mm, α=25°, the increased space is 0.75 mm. In response to the original gap distance G being 0.4 mm, the embodiment of the present disclosure increases the support pad accommodation space by 1.15 mm. In response to the transmission ratio 1:1 being maintained, the support pad accommodation space is 0.4 mm. By increasing the height of the support pad, the electronic device provides a more comfortable use attitude for the user. At the same time, the distance between the support surface and the desktop surface is increased to improve the heat dissipation ability of the electronic device, thereby solving the problem of insufficient system stability caused by insufficient heat dissipation.

Figure 16:
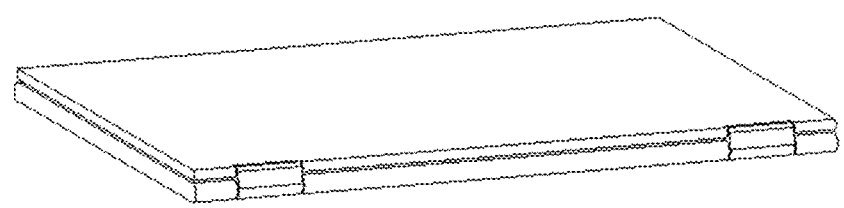
FIG. 16 illustrates a schematic diagram of another example of an electronic device according to some embodiments of the present disclosure.

In some embodiments, FIGS. 10-13 illustrate schematic diagrams of two main bodies connected by upper and lower gears with different diameters. FIGS. 14-16 illustrate schematic diagrams of relative positions between the two main bodies at different attitudes of the electronic device.

As such, the disclosed electronic device may include two main bodies connected by a connection component. The distance in the pre-set direction between each end of the two main bodies connected to the connection component may vary. As such, under the circumstance that the electronic device needs to be light and thin, the distance in the pre-set direction between the first end and the second end must be kept as small as possible. In response to the sufficient accommodation space being needed between the first end and the second end to accommodate other modules, the sufficient accommodation space is provided. The disclosed electronic device may satisfy the needs for different attitudes and/or different application scenarios of the electronic device, thereby improving user's satisfaction of using the electronic device.

It should be understood by those skilled in the art that all or part of the steps of the foregoing method embodiments may be implemented in hardware instructed by program instructions. The program may be stored in a computer readable storage medium. In response to being executed, the program performs the steps in the foregoing method embodiment. The storage medium may include a portable storage device, a read-only memory (ROM), a random-access memory (RAM), a magnetic disk, an optical disk, or various other storage medium for storing the program.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Therefore, a true scope and spirit of the invention is indicated by the following claims.

What is claimed is:

1. An electronic device, comprising:
   a connection component including:
      a first rotating assembly having a first rotating shaft;
      a second rotating assembly having a second rotating shaft, wherein the first rotating shaft and the second rotating shaft satisfy a parallel condition; and
      a third rotating assembly having a third rotating shaft connected to the first rotating assembly and the second rotating assembly, respectively;
   a first main body having a first end connected to the connection component; and
   a second main body having a second end connected to the connection component,
   wherein:

in response to the first main body and the second main body being in a first relative position, a distance in a pre-set direction between the first end and the second end is a first distance;

in response to the first main body and the second main body being in a second relative position, a distance in the pre-set direction between the first end and the second end is a second distance;

the first distance and the second distance are different;

the first rotating assembly and the second rotating assembly are configured to rotate relative to each other, driven by the third rotating assembly, and a transmission ratio between the first rotating assembly and the second rotating assembly is P:1, wherein P is positive number other than 1;

in response to the distance in the pre-set direction between the first rotating assembly and the second rotating assembly being a third distance, the distance between the first end and the second end is the first distance;

in response to the distance in the pre-set direction between the first rotating assembly and the second rotating assembly being a fourth distance, the distance between the first end and the second end is the second distance; and the third distance and the fourth distance are different.

2. The electronic device according to claim 1, further including:

at least one support component mounted on the first main body and/or the second main body, wherein:

in response to the distance in the pre-set direction between the first end and the second end being the first distance, the support component is located on one side of the first main body and the second main body;

in response to the distance in the pre-set direction between the first end and the second end being the second distance, the support component is located between the first main body and the second main body;

the first distance is smaller than the second distance; and the second distance is greater than or equal to a width of the support component in the pre-set direction.

3. The electronic device according to claim 2, wherein:
the at least one support component is evenly distributed on one or more of the first main body and the second main body.

4. The electronic device according to claim 1, wherein:
the first main body includes a display module; and
the second main body includes a keyboard.

5. The electronic device according to claim 1, wherein:
the first rotating shaft and the second rotating shaft are worm screws; and
the third rotating assembly includes worm wheels that engage with the worm screws.

6. The electronic device according to claim 1, wherein:
the first rotating assembly and the second rotating assembly have a same number of gear teeth; and
the third rotating assembly includes:

first gear teeth, capable of engaging with the first rotating assembly;

second gear teeth, capable of engaging with the second rotating assembly; and the first gear teeth and the second gear teeth rotate synchronously and a number of the first gear teeth and a number of the second gear teeth are unequal.

7. The electronic device according to claim 6, wherein the third rotating assembly further includes:

a first gear having the first gear teeth and first connecting holes; and a second gear having the second gear teeth and second connecting holes, wherein the first connecting holes and the second connecting holes are configured with connecting shafts that connect the first gear and the second gear together.

8. The electronic device according to claim 6, wherein:
the connecting shafts are rigid shafts.

9. The electronic device according to claim 6, wherein:
the first gear teeth and the second gear teeth are two sets of gear teeth located in different rotating planes of a same rotating structure.

10. The electronic device according to claim 6, wherein:
a first tooth depth of the first gear teeth is unequal to a second tooth depth of the second gear teeth.

11. The electronic device according to claim 6, wherein:
a spacer is configured between the first gear teeth and the second gear teeth.

12. The electronic device according to claim 1, wherein:
a ratio of the first gear tooth number of the first rotating assembly over the second gear tooth number of the second rotating assembly is 1:P.

13. The electronic device according to claim 1, wherein:
in response to the distance in the pre-set direction between the first rotating assembly and the second rotating assembly being the third distance, each of a first rotation angle of the first rotating assembly and a second rotation angle of the second rotating assembly is zero; and in response to the distance in the pre-set direction between the first rotating assembly and the second rotating assembly being the fourth distance, a sum of the first rotation angle of the first rotating assembly and the second rotation angle of the second rotating assembly is 360°.

14. The electronic device according to claim 13, wherein:
the first rotation angle is $180°-\alpha$ and the second rotation angle is $180°+\alpha$; and/or a transmission ratio is equal to $(180°-\alpha)/(180°+\alpha)$; and/or the first distance is equal to $C*\cos\alpha$, the second distance is C, wherein C is a straight-line distance between the first rotating shaft and the second rotating shaft; and/or the transmission ratio between the first rotating assembly and the third rotating assembly is p1/p2, the transmission ratio between the second rotating assembly and the third rotating assembly is p3/p4, and p1/p2 and p3/p4 are unequal.

* * * * *